United States Patent [19]
Shi et al.

[11] Patent Number: 5,623,659
[45] Date of Patent: Apr. 22, 1997

[54] PARENT/CHILD SUBSET LOCKING SCHEME FOR VERSIONED OBJECTS

[75] Inventors: Shaw-Ben Shi; Peter C.-T. Wang, both of Austin, Tex.

[73] Assignee: International Business Machines Corporation, Armonk, N.Y.

[21] Appl. No.: 479,243

[22] Filed: Jun. 7, 1995

Related U.S. Application Data

[63] Continuation of Ser. No. 56,013, Apr. 30, 1993, abandoned.

[51] Int. Cl.⁶ ............................................. G06F 17/30
[52] U.S. Cl. .......................... 395/608; 395/670; 395/701
[58] Field of Search ................................ 395/600, 700, 395/650

[56] References Cited

U.S. PATENT DOCUMENTS

| | | | |
|---|---|---|---|
| 4,503,499 | 3/1985 | Mason et al. | |
| 4,853,843 | 8/1989 | Ecklund | 395/600 |
| 5,175,851 | 12/1992 | Johnson et al. | |
| 5,285,528 | 2/1994 | Hart | 395/725 |
| 5,305,448 | 4/1994 | Insalaco et al. | 395/425 |
| 5,333,319 | 7/1994 | Silen | 395/650 |
| 5,339,427 | 8/1994 | Elko et al. | 395/725 |
| 5,388,268 | 2/1995 | Beach et al. | 395/700 |
| 5,414,839 | 5/1995 | Joshi | 395/600 |
| 5,418,966 | 5/1995 | Madduri | 395/725 |
| 5,440,746 | 8/1995 | Lentz | 295/163 |
| 5,459,871 | 10/1995 | Van Den Berg | 395/650 |

OTHER PUBLICATIONS

Song et al., "How Well Can Data Temporal Consistencies Be Maintained?" *1992 IEEE Symposium on Computer–Aided Control System Design (CAESD)*, 17–19 Mar., 1992, pp. 275–284.

Peter E. Dyson "Group Editing Made Easy: a Hand–on Look at Aspects", *Seybold Report on Desktrop Publishing*, vol. V7, Issue: M1, Sep. 4, 1992, pp. 9–13.

Tomasz Imielinski, New Brunswick, NJ 08903, Incomplte Objects — A Data Model for Design and Planning Applications, 1991, pp. 288–297.

A Dynamic C–Based Object–Oriented System For Unix, Engelstad et al. IEEE Software, pp. 73–85, May 1991.

An Extensible Kernel Object Management System, Rahim Yaseen, Stanley Y. W. Su and Herman Lam, 1991, pp. 247–263.

Experience with Flamingo: A Distributed, Object–Oriented User Interface System, David B. Anderson, Pittsburgh, PA 15213, OOPSLA'86 Proceedings, pp. 177–185, Sep. 1986.

Transactions for Concurrent Object–Oriented Programming Systems, Gail E. Kiser, Columbia University, pp. 136–138, no date.

(List continued on next page.)

Primary Examiner—Thomas G. Black
Assistant Examiner—Paul R. Lintz
Attorney, Agent, or Firm—Jeffrey S. LaBaw

[57] ABSTRACT

For concurrent access by a plurality of users to a data set in a memory, a computer system first searches for a write lock on a first portion of the data set which the user wishes to access. For no write lock detected, the request is granted by allowing write access to the first portion. A write lock is placed on the first portion of the data set to prevent other users from changing it, while allowing other users read access to the first portion. If a second user wants write access to a second not interesting portion of the data set, the process is similar. A search for a write lock on a second portion of the data set is conducted. If not found, the second user's request for write access to the second portion is granted. A write lock on the second portion is placed to prevent other users from changing the second portion while allowing read access. If a third user wants access to a third portion of the data set wherein the third shares some common elements with the first portion, but has other elements which are not shared, his request will partially granted to the portion of the third portion which is not shared by the first portion. A write lock is placed on the portion of the third portion to which the third user is allowed write access. When a user has finished with his portion of the data set, the write lock is removed and the parent version of the data set is updated.

20 Claims, 8 Drawing Sheets

OTHER PUBLICATIONS

Experience with CST: Programming and Implementation, Waldemar Horwat, Andrew A. Chien and William J. Dally, 1989, pp. 101–109.

Pollster, A Document Annotation System For Distributed Environment, Luis–Felipe Cabrera, Eric Mowat, pp. 142–157, Summer Conference Proceedings –Atlanta 1986.

Logical Routing Specification in Office Information Systems, Murray A. Maxer and Frederick H. Lochovsky, University of Toronoto, vol. 2, No. 4, Oct. 84, pp. 303–330.

PARENT/CHILD SUBSET LOCKING SCHEME FOR VERSIONED OBJECTS

This is a continuation of application Ser. No. 08/056,013 filed Apr. 30, 1993 and now abandoned.

BACKGROUND OF THE INVENTION

This invention relates generally to data storage in a computer system. More particularly, it relates to a locking method and system for a versioned object.

Distributed computer environments in which a plurality of processors are interconnected in a network are becoming increasingly prevalent. In these environments, several users may wish to simultaneously access and potentially update the same versioned object. A versioned object is an object with multiple copies for multiple users. Version control is one of the more important functions in various data intensive application domains such as software engineering, CAD/CAM systems and office information systems dealing with compound documents. Version control assures that a single version of the data is available to all users. Further, users in these environments need to experiment with multiple versions of an object.

Traditional Read/Write locking schemes do not distinguish between parent or child objects nor deal with partial objects. Users have to lock/unlock the whole object. Further, if the lock request failed because someone has locked the object, the user has to retry the lock request again and again until the object is available.

Commonly assigned U.S. Pat. No. 5,175,851 to Johnson et al. teaches a method by which a plurality of users can share access to a data file through the use of tokens. A plurality of users can have read tokens to a portion of the data, however, when one user acquires a read/write token all of the read tokens held by other users are revoked. The user with the read/write token controls a physical page of storage used for the file, rather than only the logical portion of the file which the user wishes to modify.

The advantage of allowing programmers to checkout part of the objects is that it allows more users to work on the same object. However, it is commonly recognized as a difficult task to merge the work from multiple users on the same object together. Optimistic concurrency control allows users to checkout objects freely. However, if there are multiple users update the same object, only one user's update will be accepted. All other updates are aborted.

This application proposes an improved locking scheme for a versioned object.

SUMMARY OF THE INVENTION

It is therefore an object of the invention to support concurrent access to a versioned object by a plurality of users in a distributed data processing environment.

It is another object of the invention to update multiple copies of a versioned object based on one user's changes to a portion of the versioned object.

It is another object of the invention to lock different logical portions of an object for exclusive write access by different users.

These objects and others are accomplished by a plurality of lock modes designed to handle concurrency control of versioned objects. "Cooperative," "Notify" and "Reserve" lock modes are the unique lock modes designed to increase concurrent object usage.

The method, system and program for concurrent access by a plurality of users to a data set in a shared memory of a computer system first searches for a lock on a first portion of the data set which the user wishes to access. If no lock is detected, the request is granted by allowing access to the desired portion. A lock is placed on the desired portion of the data set to prevent other users from accessing it. If a second user wants a second portion of the data set, the process is similar. A search for a lock on a second portion of the data set is conducted. If not found, the second user's request for access to the second portion is granted. A lock on the second portion is placed to prevent other users access. If a third user wants access to a third portion of the data set wherein the third data set shares some common elements with the first portion, on which already has a lock placed, his request will be partially granted. He will receive an exclusive write lock on a portion of the third portion which is not shared by the first portion. The user will generally have read access to all portions of the object, whether or not he has all exclusive write lock on any portion of the object. When a user has finished with his portion of the data set, the lock is removed the number of records in his updated portion are compared to the number of records in this portion when first received and the parent copy of the data set is updated accordingly.

Normally, when a user requests access to a previously reserved portion of the data set, the request is denied. However, the invention includes two modes which help mitigate the situation. If a user is not sure that he will actually need a portion of the data set, but would like to place a lock on the desired portion for future use, he may lock in a notify mode. If a second request by a second user is detected, a message to the user that has the notify lock is sent, indicating that the second request for the desired portion has been received. He may change the lock mode to an exclusive access mode, or if he takes no action, his lock on the desired portion will be removed. A reservation mode allows users to queue up in advance for the desired portion, if the search for the lock indicates that the desired portion is already being used.

BRIEF DESCRIPTION OF THE DRAWINGS

These features, advantages, objects and others will be more readily understood with reference to the attached drawings and following description.

DETAILED DESCRIPTION OF THE DRAWINGS

The invention may be run on a variety of computers or collection of computers under a number of different operating systems. The computer could be, for example, a personal computer, a mini computer or mainframe computer. A plurality of computers which are part of a network such as a Local Area Network or Wide Area Network or larger teleprocessing system may be used. Although the specific choice of computer is limited only by disk and disk storage requirements, computers in the IBM PS/2 (™) series of computers could be used in the present invention. For additional information on IBM's PS/2 series of computers, the reader is referred to *Technical Reference Manual Personal* System/2 Model 50, 60 Systems IBM Corporation, Part No. 68X2224 Order Number S68X-2224 and *Technical Reference Manual Personal Systems/2 (model 80) IBM Corporation* Part No. 68X2256 Order Number S68X-2254. One operating system which an IBM PS/2 personal computer may run is IBM's OS/2 2.0 (™) for more information on the IBM OS/2 2.0 Operating System the reader is referred to *OS/2 2.0 Technical Library, Programming Guide Vol.* 1, 2, 3 *Version* 2.00 Order Nos. 10G6261, 10G6495, 10G6494.

In the alternative, the computer system might be in the IBM RISC System/6000 (™) line of computers which run on the AIX (™) operating system. The various models of the RISC System/6000 are described in many publications of the IBM Corporation, for example, *RISC System/6000, 7073 and 7016 POWERstation and POWERserver Hardware Technical* reference, Order No. SA23-2644-00. The AIX operating system is described in *General Concepts and Procedure—AIX Version* 3 *for RISC System/6000* Order No. SC23-2202-00 as well as other publications of the IBM Corporation.

Figure 1:
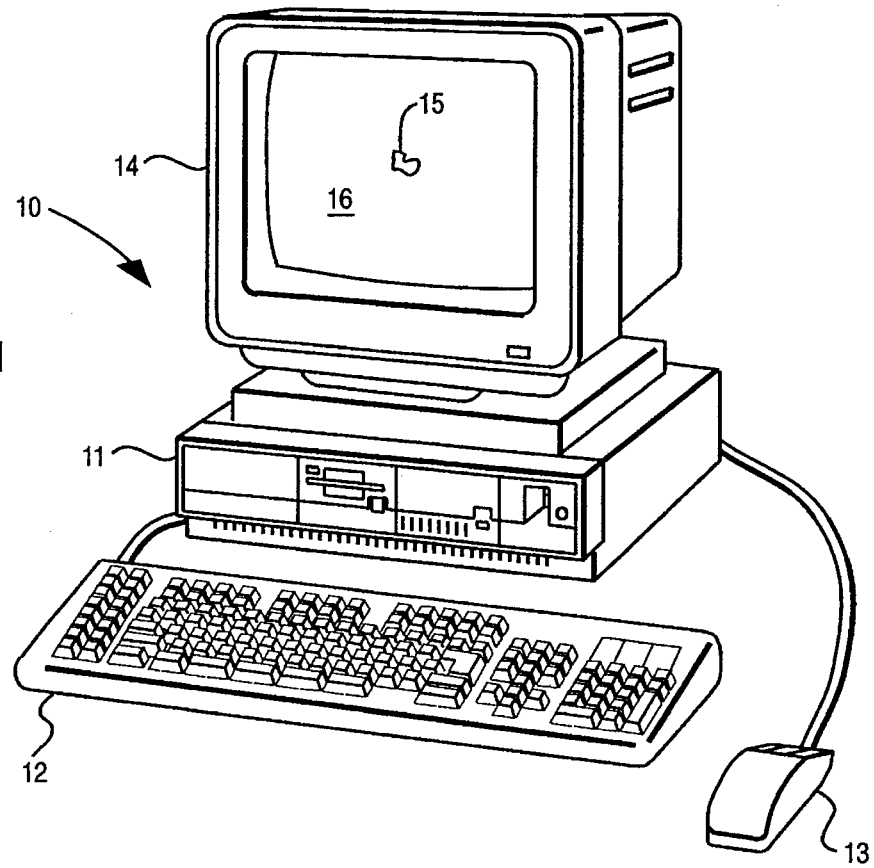
FIG. 1 depicts a single computer system including system unit, display, keyboard and mouse.

In FIG. 1, a computer 10, comprising a system unit 11, a keyboard 12, a mouse 13 and a display 14 are depicted. The screen 16 of display device 14 is used to present the visual changes to the data object. A graphical user interface supported by the operating system allows the user to use a point and shoot method of input by moving the pointer 15 to an icon representing a data object at a particular location on the screen 16 and press one of the mouse buttons to perform a user command or selection.

Figure 2:
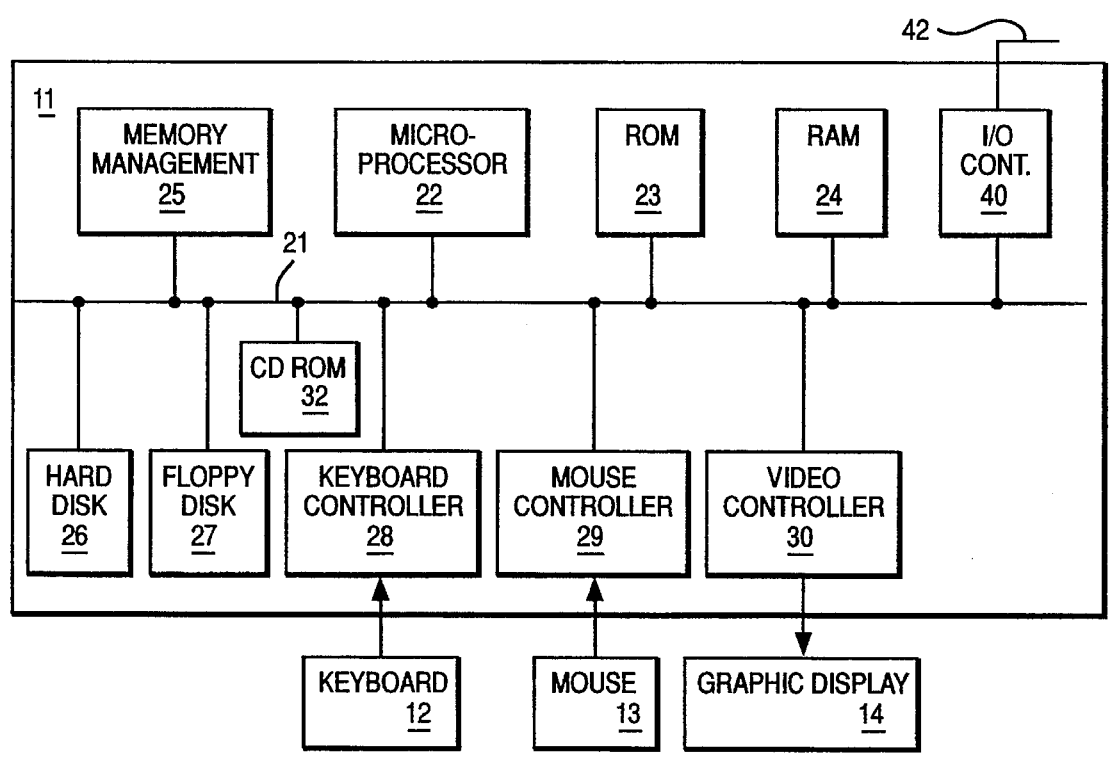
FIG. 2 is a block diagram of the components of the computer depicted in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. A CD ROM drive 32 also coupled to the system bus 21 is used to store a large amount of data, e.g., multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14. An I/O controller 40 such as a Token Ring Adapter enables communication over a network 42 to other similarly configured data processing systems.

Figure 3:
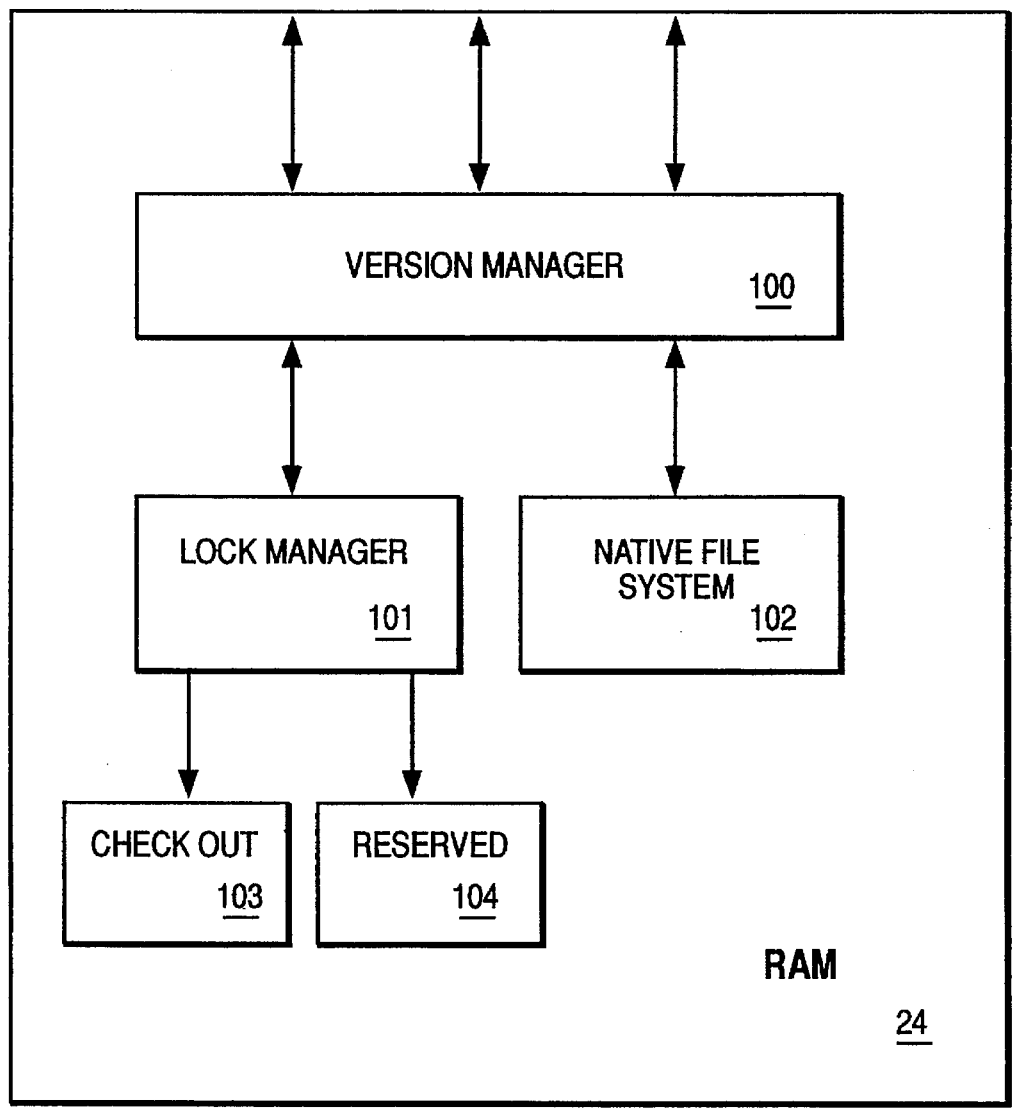
FIG. 3 is a block diagram of the components of the version control system in the memory of the computer of FIG. 1.

The structure of the version control system as implemented in a plurality of code modules in memory 24 is depicted in FIG. 3.

The version control system when not actively resident in RAM 24 may be stored on a computer readable medium sch as a floppy diskette for the floppy disk drive, a CD-ROM for the CD-ROM drive or on the hard disk drive.

The version control system consists of the following major components: The Version Manager 100; The Lock Manager 101; and The Native File System 102 The Version Manager 100 interacts with users to obtain the checkin or checkout commands from the users. The Version Manager 100 parses the parameters to make sure values are appropriate. Then, the Version Manager 100 issues a LockParent command to the Lock Manager 101 to check whether the user is able to create child objects. The Lock Manager 101 maintains all the checkin and checkout records. Lock Manager 101 maintains a check out queue 103 and a reserved check out queue 104 to keep track of the status of an object. The check out queue 103 keeps track of users who have checked out partial or full object. The reserved check out queue 104 to keep track of users who made reservations to access an object.

After the Lock Manager 101 approves the lock access, the Version Manager 100 will invoke the Native File System 102 to create child objects from the parent objects. The child object identifier is returned to the user.

Users can declare objects to be either versioned or non-versioned objects. Users use "check-out" and "check-in" commands provided by the version manager to access versioned objects. A new version will be created from the existing version whenever it is being updated. The Version Manager 100 keeps track of the version derivation hierarchy.

When a user uses a "check-out" command to checkout a versioned object, the version manager will create a transient version for the user. All updates will be applied to this transient object. Since this transient object belongs only to this user, he will get an exclusive lock on the transient object automatically by the Lock Manager 100.

Since the same parent version might ordinarily be checked out by other users, the access to the parent object must be controlled when a transient object is in place. A locking command is provided called "LockParent" to control whether a new version can be created from the same parent version. This command is used by the Version Manager 100. When users issue the checkout command, users should provide the lock mode and the flag. Then, the Version Manager 100 can issue LockParent based on the information provided by the user.

The format of the LockParent command is as follows:

LockParent(userid,objectId,mode,from,to)

"Userid" refers to the user identifier (or logon user id). The objectId refers to the object identifier of the parent object.

"Mode" refers to the access modes provided by the lock manager. "From" and "to" refer to the starting and ending record number which the user wants to check out.

The Lock Manager provides the following access modes:

"R" gives "reference" access to the requested parent object. With the parent version locked in "reference" mode, other users can still check out this parent version and create parallel versions through the checkout command.

"F" gives "freeze" access to the requested parent object. With this access right granted, no one else is allowed to create permanent versions from this object. However, a transient version can be created for a locking request in reference mode.

"C" gives "cooperative" access to the requested parent object. In this mode, parallel child versions can be generated from the requested parent object. By providing the "from" and "to" record numbers, users can check out partial objects. The lock manager will ensure that each user's work is non-conflicting and merges non-conflicting work when objects are checked back in. In effect, each user has "freeze" access to their particular portion of the parent object and "reference" access to all other portions.

"N" gives "notify" access to the requested parent object. This lock mode is for those users who are not sure what they are going to do with the objects they checked out. The lock manager allows them to defer their decisions.

"RE" gives "reserve" access to the parent object. Users can make reservations for accessing a versioned object.

Reference mode ("R") is particularly useful for a programmer who wants to look at relevant source objects to borrow ideas. In this case, he does not really care whether another person is creating a new version of that object or not. The "Check-in" command is prohibited with "reference" mode. Cooperative mode ("C") is useful when multiple users work on the same source file, but on different modules. In the cooperative access mode, more than one person can create child versions from the same parent version.

Notify mode ("N") allows users to defer their decisions on the actual lock mode until somebody else is requesting a "freeze" lock on the same parent object. This feature will reduce some unnecessary lock requests by conservative users and increase concurrent object usage.

Reserve mode ("RE") allows users to make reservations for accessing a particular object. Normally, if the parent object has been locked by some other users with "freeze" mode, the user has to keep trying until the object is available.

Figure 4A:
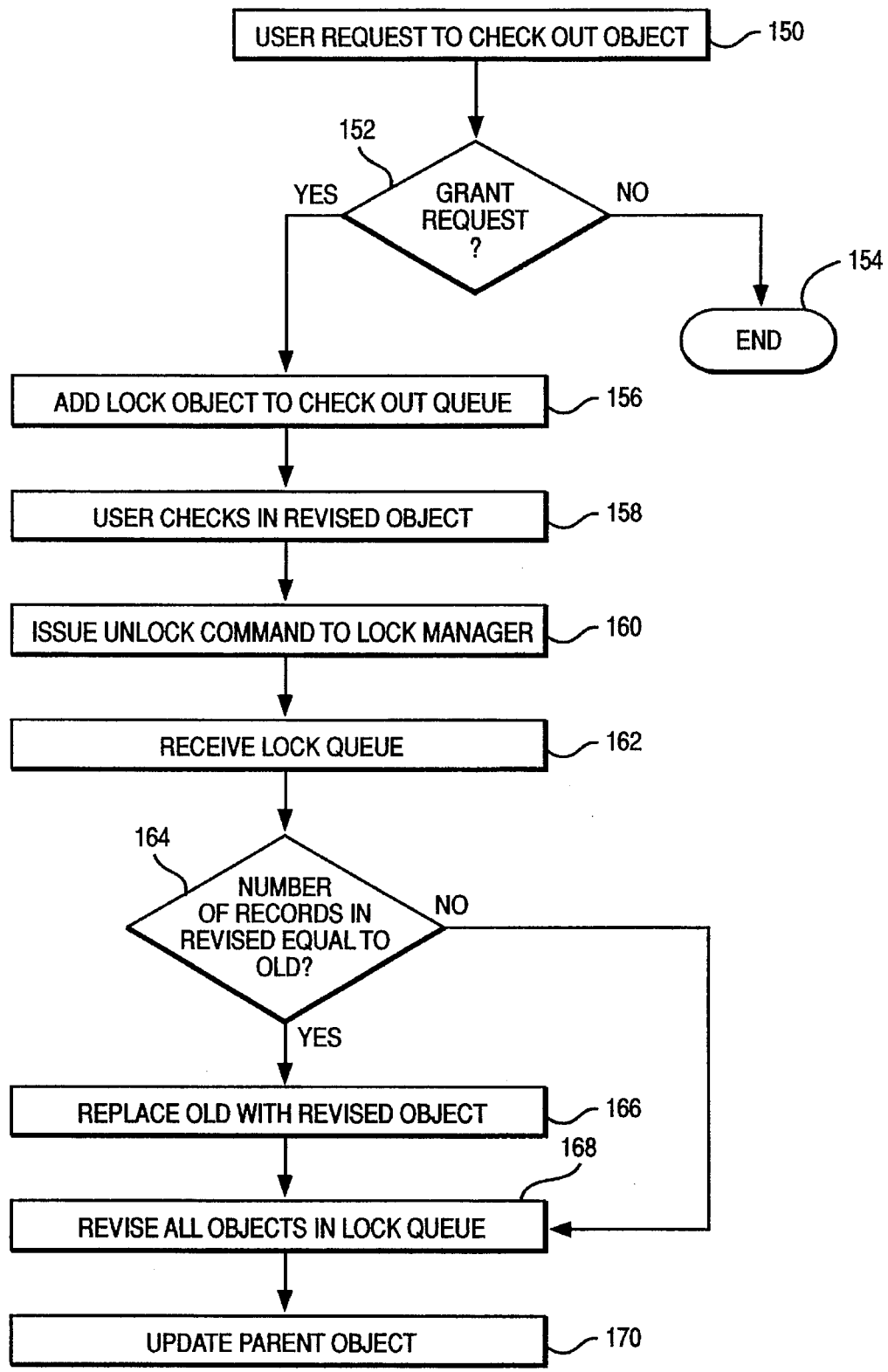
FIGS. 4A–4C are block diagrams of the operation of the Cooperative Access process of the version control system.
Figure 4B:
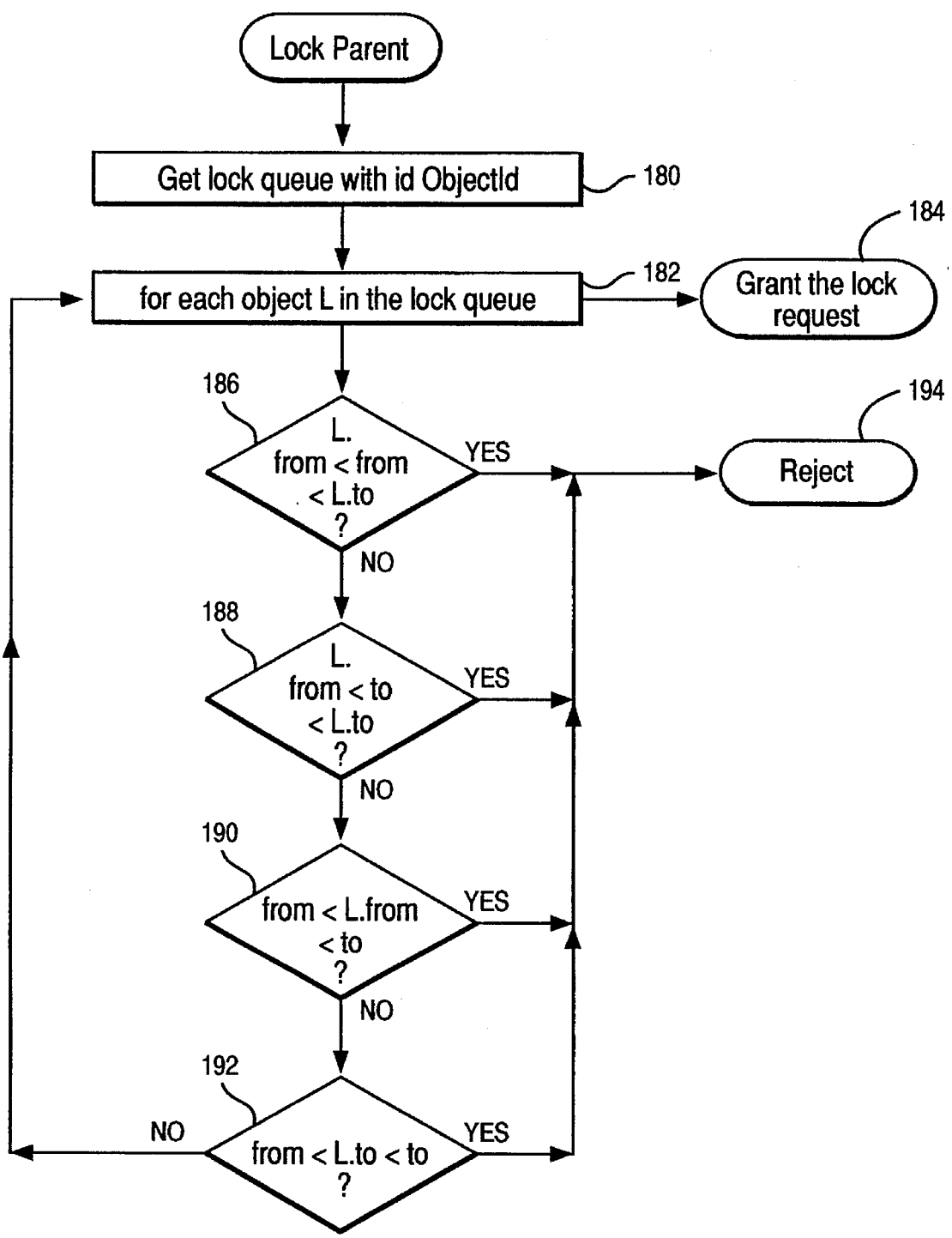
Figure 4C:
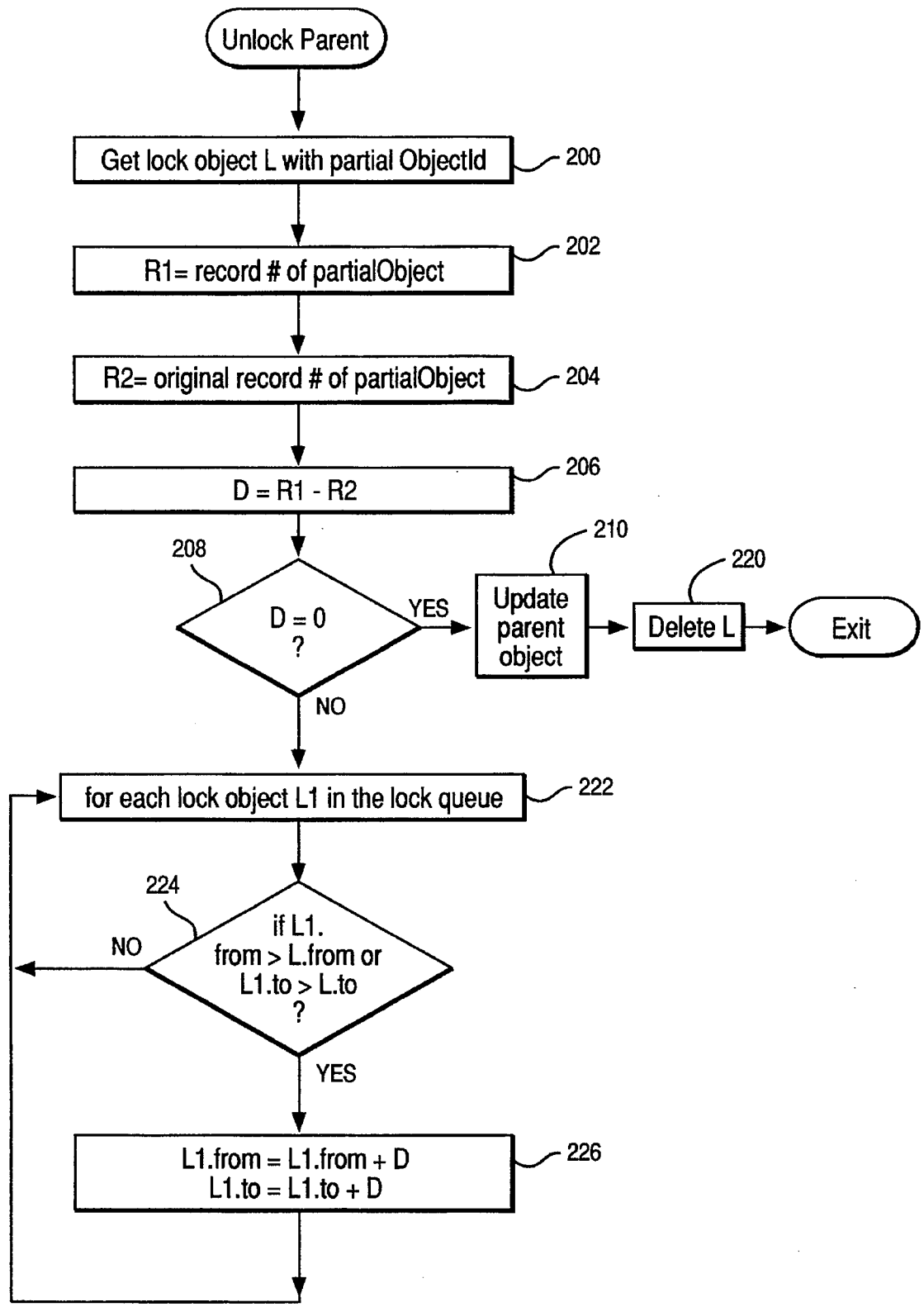

The Cooperative Access mode of the version control system is depicted in FIGS. 4A–4C.

In a software development environment, it is possible that more than one person might need to work on the same source object, but on different parts of the source object, especially for a large source object. With the Cooperative Access mode, users can check out, i.e. freeze, only the part of an object in which they are interested. The Lock Manager ensures each user's work is non-conflicting with other users and merges non-conflicting work when objects are checked in.

Referring to FIG. 4A, the process begins in step 150 with the receipt of a user request to check out an object. Next, in step 152, the Lock Manager determines whether to grant the user's request. If the user's request conflicts with a previously granted request, the Lock Manager will deny the request and the process will end, step 154.

As stated above, when supporting the Cooperative Access mode, the Lock Manager maintains a check out queue to keep track of users who checked out a partial or a full object. If the request is granted, a lock object will be added to the check out queue, step 156.

A lock object has the following information:

(1) User ID: The name of the user who request the lock.

(2) From: The starting record number. If no "from" parameter is specified in the LockParent command, "from" is set to 0.

(3) To: The ending record number. If no "to" parameter is specified in the LockParent command, "to" is set to the maximum value.

(4) TranObjectId: The transient object identifier.

(5) Lock mode: Described above and in further detail below.

(6) Timestamp: Time stamp for the request.

(7) Priority: Priority of the lock request.

When the Lock Manager receives the request in step 150, it will first check whether the range of records that the user requested conflicts with the range of records of any previously granted, existing LockParent request. This process is described in greater detail in FIG. 4B.

After the user finishes updating the object, he will check in the partial object with the Checkin command in step 158. The Version Manager will issue a UnLockParent command to the Lock Manager in step 160. The Lock Manager identifies the correct lock object from the lock queue by using the partial object identifier (partialObjectId), step 162. Next, the Lock Manager checks whether the number of records for the new partial object has changed by the difference of the number of records in the new and old versions of the partial object. Step 164. If the user not added or deleted any records (i.e. the difference is zero), in step 166, the Lock Manager asks the Version Manager to create a new version of the parent object by replacing records from "from" to "to". Otherwise, the Lock Manager updates the from and to information of all lock objects in the lock queue, in step 168. Then the parent object is updated.

The process by which the Lock Manager determines whether the request to check out the object should be granted is depicted in FIG. 4B. In step 180, the lock queue is retrieved with the object ID's for each lock object in the lock queue. In step 182, the Lock Manager ensures that the range of records specified by the LockParent Request is tested against each of the lock objects in the lock queue. If there are no lock objects in the lock queue in step 184, the lock request is granted on the partial object. In steps 186 through 192, a series of tests is performed to determine whether the range of records of the current LockParent Request falls within the range of records of the lock object L against which it is currently being tested. Thus, in step 186, if the starting record of the current request, i.e., "from", falls between the range of the current lock object, some of the records in the request overlap those in the lock object and so the request is rejected in step 194. Similarly, if the ending record, e.g., "to", of the current request falls between the range of the lock object, i.e. L.from to L.to, the request is rejected. In steps 190 and 192, the beginning and end of the lock object are tested to determine whether either falls within the range of the current request. If none of the records in the current request have been previously locked with a lock object in the lock queue, the request is granted in step 184.

The following is a code sample for the LockParent request:

```
procedure LockParent(userid,objectId,from,to,mode)
{
    Get the lock queue of object with id objectId
    for each lock object L in the lock queue
    {
        /* Check whether interval [from,to].
           intercepts with interval       */
```

```
        /* [L.from,L.to].
*/
        if L.from < from < L.to
            then reject the lock request
        else
        if L.from < to < L.to
            then reject the lock request
        else
        if from < L.from < to
            then reject the lock request
        else
        if from < L.to < to
            then reject the lock request
        else
            grant the lock request and put
            the lock request in the lock
            queue
    }
}
```

The process by which the Lock Manager determines how a revised partial object should be used to update the parent object and the lock queue is illustrated in FIG. 4C. In step 200, the lock object which corresponds to the partial object idea is retrieved. Next, in step 202 the record number of the partial object is retrieved. In step 204, the original record number of the partial object is retrieved. In step 206, the difference is calculated between the current and original number of records. Next, in step 208 a test is determined whether the difference equals zero, if so, the same number of records are in the updated partial object as in the original partial object. If the number of records is unchanged, in step 210 the parent object is updated and in step 220 the lock object is deleted from the lock queue. The process ends. If the difference does not equal zero, the number of records has changed. Therefore, in step 222, each lock object is retrieved from the lock queue and those with higher record numbers than the updated partial object will have their beginning and ending parameters increased decreased or according to the difference between the updated partial object and the original partial object.

The following is one sample code embodiment of the UnlockParent command:

```
procedure UnlockParent(userid,objectId,partialObjectId)
{
    Get lock object (L) with partialObjectId
    Get the record number R1 of partialObject
    Calculate the original record number R2 of
partialObject
        where R2 = (L.to - L.from) +1
    Calculate the difference D = R1 - R2
    if D equals to 0
    then
    {
        Update the parent object with new data
        Delete L from the lock queue
    }
    else
    {
        Get the lock queue of object with id objectId
        for each lock object L1 in the queue
        {
            if (L1.from > L.from) or (L1.to > L.to)
            then
            {
                L1.from = L1.from + D
                L1.to = L1.to + D
            }
        }
    }
}
```

Figure 5:
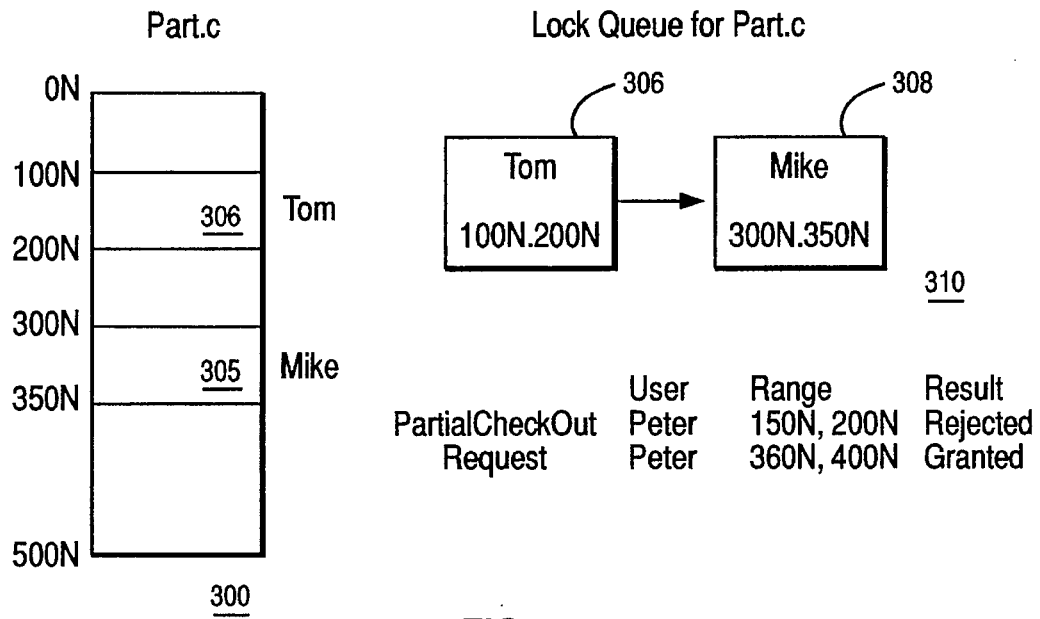
FIG. 5 depicts an object of which two users have checked out partial copies and a third user wished to check out another partial copy.
Figure 6:
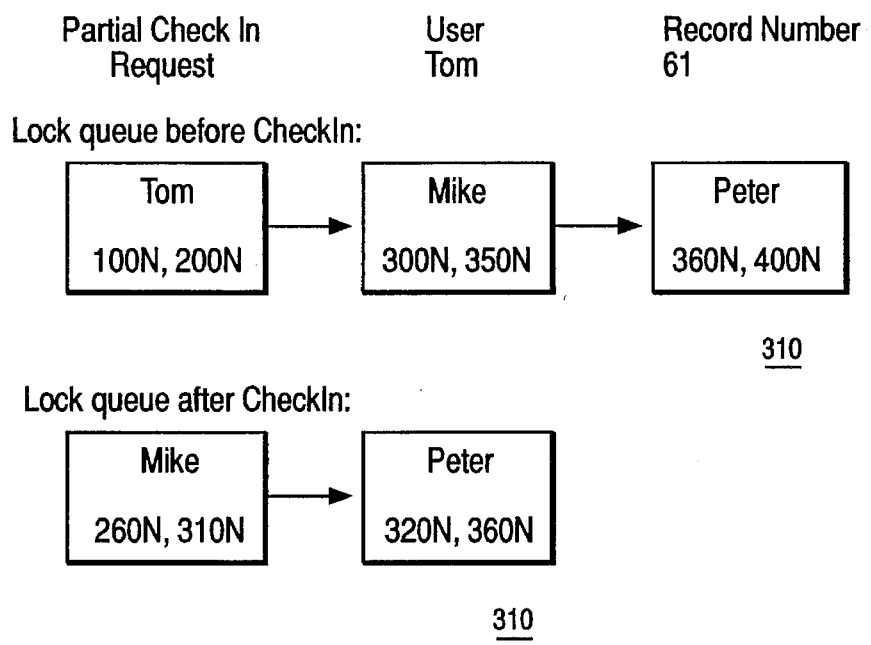
FIG. 6. depicts the lock queue of the object in FIG. 5 before and after one user has checked in his partial copy of the object.

FIGS. 5 and 6 illustrate source objects to which concurrent access has been provided via the LockParent and UnLockparent procedures. The name of the source object in this example is "Part.c." There are currently two users who have checked out a portion of the "Part.c" object which is shown as block 300 in FIG. 5. Tom has checked out source code from line 100N to 200N. Mike has checked out source code from line 300N to 350N. The checked out partial copies 303, 305 of the object 300 are reflected by lock objects 306, 308 in the lock queue 310. When Peter tries to check out Part.c from line 150N to 250N, his request will be rejected since 150N to 200N were checked out by Tom. Peter's request of checking out Part.c from 360N to 400N will be granted by the Version Manager, since there is no existing lock object for these records.

In FIG. 6, Tom finished his work and tries to check in his partial object 303. Since he deleted some of the source code that he checked out, his partial object has only 61 lines (101 lines originally). The version control system will update the lock request on the queue. The result is shown in FIG. 6. When Mike checked in his partial object 305, his starting line number will be 260N instead of 300N.

Figure 7:
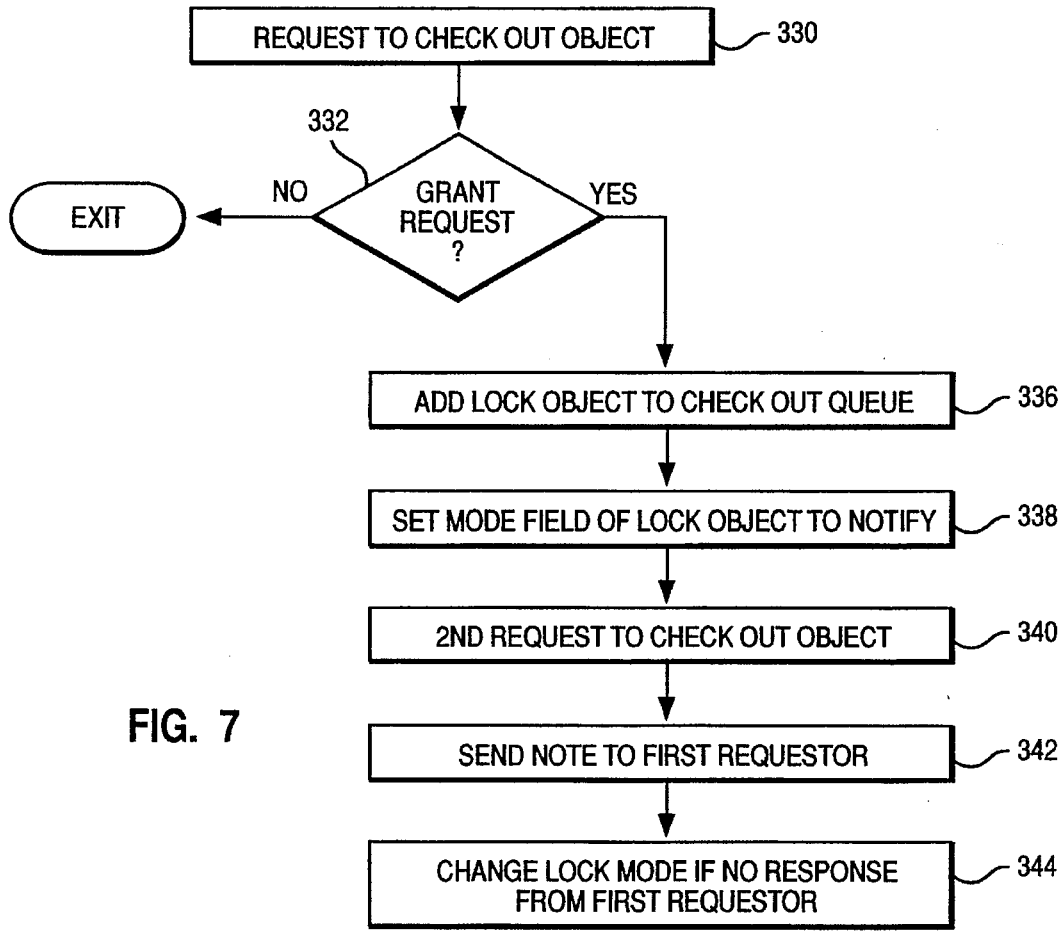
FIG. 7 is a flow diagram of the notify lock mode.

The Notify Lock Mode is for those users who are not sure what they are going to do with the objects they checked out. The Lock Manager allows them to defer their decisions until somebody else is requesting a "freeze" lock on the same parent object. This procedure is depicted in FIG. 7.

When the Lock Manager receives the LockParent request with the Notify Lock Mode, in step 330, it first checks whether the range of records that the user requested conflicts with any existing lock from a prior LockParent request. If it does, the LockParent request will be rejected and the process ends, step 334. Otherwise, the LockParent request will be granted and a lock object will be added to the check out queue in step 336. The mode field of the lock object is set to Notify lock mode in step 338.

When the Lock Manager finds that a second LockParent request conflicts with an existing lock, step 340, and the parent object was checked out with the Notify lock mode, it will do the following:

In step 342, a note will be sent to the lock holder's reader to ask the lock holder change the lock mode. Next, in step 344, if the lock mode is not changed within one day, the lock mode will be changed to "reference" and the user who requested a "freeze" lock will freeze the parent object.

Normally, cautious users tend to check out objects if they are not sure whether they will make any changes. Since the prior art only included a lock analogous to the current invention's "freeze" mode, this prevented other users from access to the object. It is annoying when cautious users check out objects for a long period of time. The "notify" mode will reduce some unnecessary lock requests by conservative users and increase concurrent object usage.

Figure 8:
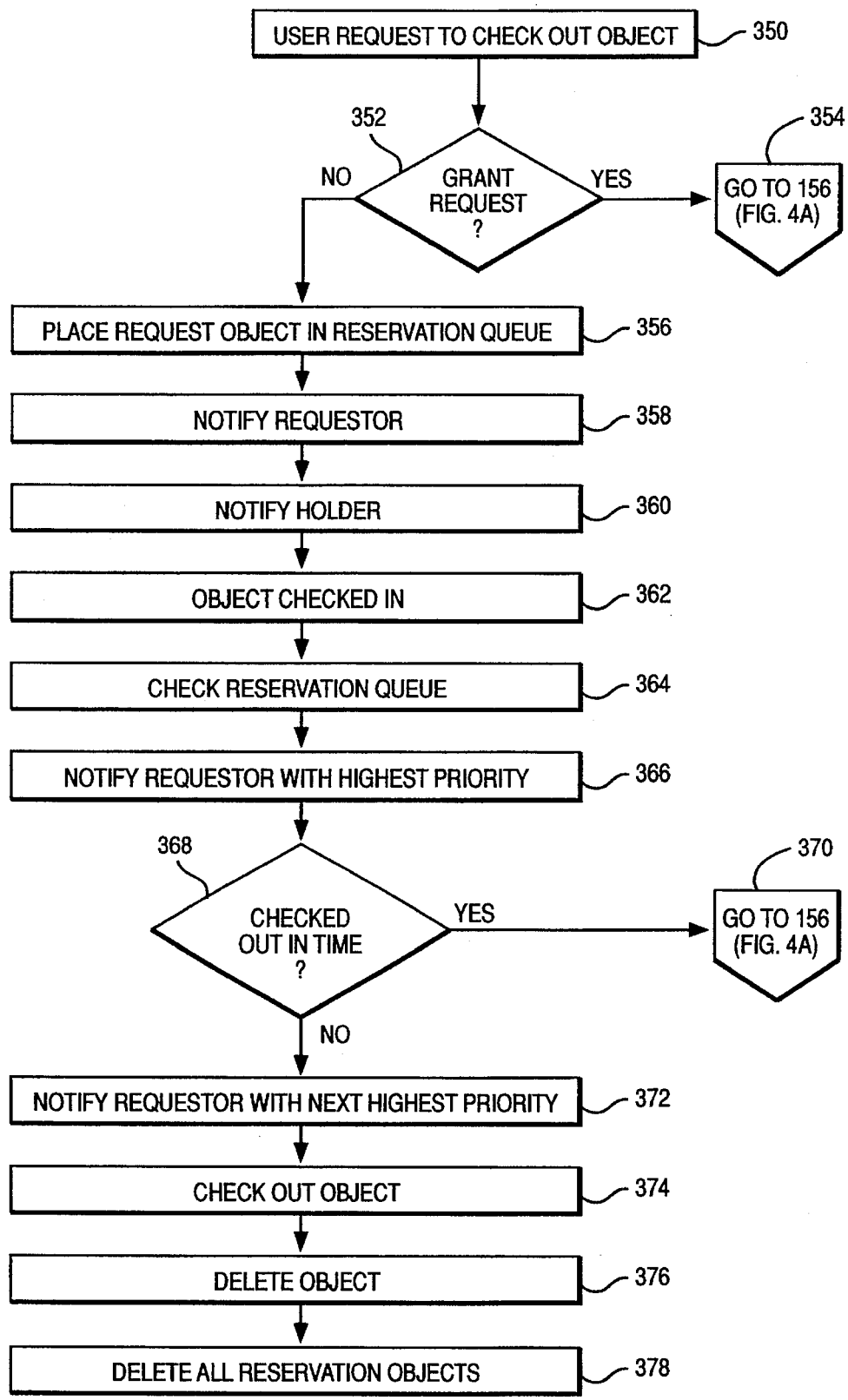
FIG. 8 is a flow diagram of the reserve lock mode.

The purpose of the Reserve Lock mode is that users can make a reservation for a source object access without repeatedly trying to check out an object when the object is not available. This process is depicted in FIG. 8

After the Lock Manager receives the request, it will first check whether the object has been checked out, step 352. If the object has not been checked out, the object will be locked in exclusive access mode and a permission object will be returned to the user. The flow will continue as in FIGS. 4A–4C starting from step 156. If the object has been checked out, the Lock Manager will put a request object in the reservation queue, step 356.

A note will be sent to the user to notify him that his request has been put into the reservation queue, step 358. At the same time, in step 360, the Lock Manager will inform the Version Manager to send a reminder to the user who is currently holding the object. The reminder will be sent every 24 hours until the user checks in the object.

When the object has been checked in, in step 362, the Lock Manager will check the reservation queue in step 364, and pick the request object with the highest priority. If there is more than one request object with the same priority, the object with the smallest timestamp will be chosen.

A note will be sent to the user whose userid is in the request object, step 366. The user needs to check out the object within 24 hours, or other predetermined period step 368., If he does so, normal processing continues as shown in FIGS. 4A–4C, step 370. Otherwise, the system will select the second request object from the reservation queue, step 372.

It is possible that the person who checks out an object in step 374 might decide to delete the object in step 376. In this case, all current users in the reservation queue will be notified that the object has been deleted and all reservation objects in the queue will be deleted, in step 378.

Figure 9:
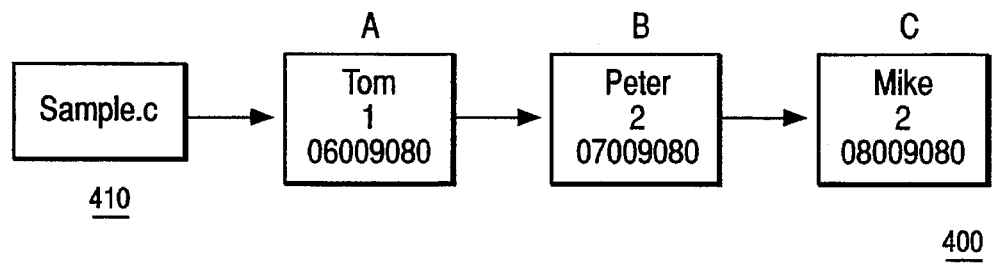
FIG. 9 depicts three request objects for the reserve lock mode.

FIG. 9 illustrates the reservation process. There are three request objects A, B, C in the reservation queue 400 for the Sample.c in object 410. When the system receives a "Checkin" command, the request object A will be chosen since it has the highest priority and smallest timestamp. A note will be sent to user Tom asking him to check out the module. Tom needs to check out Sample.c 400 within a day, or other predetermined time period. Otherwise, the system will send a note to Peter who holds the request object B which has a smaller timestamp, although the same priority as request object C.

The table below gives the compatibility matrix of the request modes. The rows correspond to the mode of lock being requested and the columns correspond to the mode of lock already being held by another transaction, i.e. The lock modes of entries in the lock queues. The possible lock requests are: R (referenced), F (freeze), N (notify), C (cooperate), RE (reserve). NL means no transaction is holding locks on the parent object. The entries may be "yes", the requested lock may be granted and "No" it may not be granted). Other entries include: "NL" represents the absence of a request; "NfRe" which means that the user who requested the lock will be notified of the current status of the lock; "NfOwn" which means that the current lock holder will be notified that other people are requesting access rights to this object, and "Rev" which means that the lock request will be put into the reservation queue.

|    | R   | F     | N         | C     | RE    |
|----|-----|-------|-----------|-------|-------|
| R  | Yes | Yes   | Yes       | Yes   | Yes   |
| F  | Yes | No    | NfRe      | No    | No    |
| N  | Yes | NfOwn | NfOwn     | NfOwn | NfOwn |
| C  | Yes | No    | NfRe      | Yes   | No    |
| NL | Yes | Yes   | Yes       | Yes   | Yes   |
| RE | Rev | Rev   | NfOwn,Rev | Rev   | Rev   |

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A method for version control of a versioned object in a memory of a computer system, comprising the steps of:

searching for a write lock on a first subset of the versioned object;

responsive to an absence of the write lock on the first subset granting a first request by a first user for write access to the first subset;

creating and transmitting a first child object of the versioned object to the first user, the first child object only a portion of the versioned object including a copy of the first subset; and placing a write lock on the first subset of the versioned object to prevent other users from currently modifying the first subset, while allowing other users read access to the first subset.

2. The method as recited in claim 1 further comprising the steps of:

searching for a write lock on a second subset of the versioned object;

responsive to an absence of the write lock on the second subset, granting a second request by a second user for write access to the second subset;

creating and transmitting a second child object of the versioned object to the second user, the second child object only a portion of the versioned object including a copy of the second subset; and placing a write lock on the second subset of the versioned object to prevent other users from currently modifying the second subset while allowing other users read access to the second subset.

3. The method as recited in claim 1 further comprising the steps of:

searching for a write lock on a second subset of the versioned object, the second subset having a first set of elements in the first subset, and a second set of elements outside the first subset;

responsive to a presence of the write lock on the first set of elements and an absence of the write lock on the second set of elements, granting a request by a second user for write access to the second set of elements of the second subset; and creating and transmitting a second child object of the versioned object to the second user, the second child object only a portion of the versioned object including a copy of the second set of elements of the second subset;

placing a write lock on the second set of elements of the second subset of the versioned object.

4. The method as recited in claim 1 further comprising the steps of:

modifying data in the first child object in response to a command from the first user;

transmitting the modified first child object to the versioned object;

updating the versioned object to reflect changes in the modified first child object; and releasing the write lock on the first subset of the versioned object.

5. The method as recited in claim 1 wherein the write lock on the first subset of the versioned object is in a notify mode and the method further comprises the steps of:

searching for a write lock on the first subset in response to a second request by a second user for write access to the first subset;

sending a message to the first user that the second request for the first subset has been received; and releasing the write lock on the first subset if no response by the first user has been received within a predetermined period.

6. The method as recited in claim 1 further comprising the steps of:

searching for a write lock on the first subset of the versioned object in response to a second request by a second user for access to the first subset;

placing a request object in a reservation queue in response to finding the write lock on the first subset.

7. The method as recited in claim 1 wherein the write clock on the first subset of the versioned object is a lock object in a lock queue the lock object including a range of the first subset.

8. A system for version control of versioned object in a memory of a computer system, comprising:

means for searching for a write lock on a first subset of the versioned object;

means responsive to an absence of the write lock on the first subset for granting a first request by a first user for write access to the first subset; and means for creating and transmitting a first child object of the versioned object to the first user, the first child object only a portion of the versioned object including a copy of the first subset;

means for placing a write lock on the first subset of the versioned object to prevent other users from currently modifying the first subset, while allowing other users read access to the first subset.

9. The system as recited in claim 8 further comprising:

means for searching for a write lock on a second subset of the versioned object;

means responsive to the absence of the write lock on the second subset for granting a second request by a second user for write access to the second subset; and means for creating and transmitting a second child object of the versioned object to the second user, the second child object only a portion of the versioned object a copy of including the second subset;

means for placing a write lock on the second subset of the versioned object to prevent other users from currently modifying the second subset, while allowing other users read access to the second subset.

10. The system as recited in claim 8 further comprising:

means for searching for a write lock on a second subset of the versioned object, the second subset having a first set of elements in the first subset and a second set of elements outside the first subset;

means responsive to the presence of the write lock on the first set of elements and the absence of the write lock on the second set of elements for granting a request by a second user for write access to the second set of elements of the second subset;

creating and transmitting a second child object of the versioned object to the second user, the second child object only a portion of the versioned object including the second set of the elements of the second subset; and means for placing a write lock on the second set of elements of the second subset.

11. The system as recited in claim 8 further comprising:

means for modifying data in the first child object responsive to a command from the first user;

means for transmitting the modified first child object to the versioned object;

means for updating the versioned object to reflect changes in the modified first child object; and means for releasing the write lock on the first subset of the versioned object.

12. The system as recited in claim 8 wherein the write lock on the first subset of the versioned object is in a notify mode and the system further comprises:

means for searching for a lock write on the first subset in response to a second request by a second user for write access to the first subset;

means for sending a message to the first user that the second request for the first subset has been received; and means for releasing the write lock on the first subset if no response by the first user has been received within a predetermined period.

13. The system as recited in claim 8 further comprising:

means for searching for a write lock on the first subset of the versioned object in response to a second request by a second user for write access to the first subset; and means for placing a request object in a reservation queue in response to finding the write lock on the first subset.

14. The system as recited in claim 8 wherein the write lock on the first subset of the versioned object is a lock object in a lock queue the lock object including a range of the first subset.

15. A computer program product on a computer readable medium for version control of a versioned object in a memory of a computer system, comprising:

means for searching for a write lock on a first subset of the versioned object;

means responsive to the absence of the write lock on the first subset for granting a first request by a first user for write access to the first subset; and means for creating and transmitting a first child object of the versioned object to the first user, the first child object only a portion of the versioned object including a copy of the first subset;

means for placing a write lock on the first subset of the versioned object to prevent other users from currently modifying the first subset, while allowing other users read access to the first subset.

16. The product as recited in claim 15 further comprising:

means for searching for a write lock on a second subset of the versioned object;

responsive to the absence of the write lock on the second subset, means for granting a second request by a second user for write access to the second subset; and creating and transmitting a second child object of the versioned object to the second user, the second child object only a portion of the versioned object including a copy of the second subset;

means for placing a write lock on the second subset of the versioned object to prevent other users from currently modifying the second subset, while allowing other users read access to the second subset.

17. The product as recited in claim 15 further comprising:

means for searching for a write lock on a second subset of the versioned object, the second subset having a first set of elements in the first subset, and a second set of elements outside the first subset;

means responsive to the presence of the write lock on the first set of elements and the absence of the write on the second set of elements for granting a request by a second user to the second set of elements of the second subset; and creating and transmitting a second child object of the versioned object to the second user, the second child object only a portion of the versioned object including the second set of elements of the second; subset; and means for placing a write lock on the second set of elements of the second subset.

18. The product as recited in claim 15 further comprising:

means for modifying data in the first child object responsive to a command from the first user;

means for transmitting the modified first child object to the versioned object;

means for updating the versioned object to reflect changes in the modified first child object; and means for releasing the write lock on the first subset of the versioned object.

19. The product as recited in claim 15 wherein the write lock on the first subset of the versioned object is in a notify mode and the product further comprises:

means for searching for a write lock on the first subset in response to a second request by a second user for write access to the first subset;

means for sending a message to the first user that the second request for the first subset has been received; and means for releasing the write lock on the first subset if no response by the first user has been received within a predetermined period.

20. The product as recited in claim 15 further comprising:

means for searching for a write lock on the first subset of the versioned object in response to a second request by a second user for write access to the first subset;

means for placing a request object in a reservation queue in response to finding the write lock on the first subset.

* * * * *